United States Patent

Castonguay et al.

[11] Patent Number: 5,684,282
[45] Date of Patent: Nov. 4, 1997

[54] DRAWOUT CIRCUIT BREAKER, POSITION SWITCH AND RESET ARRANGEMENTS

[75] Inventors: Roger N. Castonguay, Terryville; Jeffrey D. Lord, Unionville, both of Conn.

[73] Assignee: General Electric Company, New York, N.Y.

[21] Appl. No.: 624,657

[22] Filed: Mar. 22, 1996

[51] Int. Cl.[6] .............................. H01H 9/20; H01H 3/20; H01H 21/00
[52] U.S. Cl. ........................... 200/50.21; 200/50.26; 200/553; 200/332
[58] Field of Search ............... 200/50.02, 50.21–50.27, 200/61.4–61.42, 61.44, 61.58 R, 331–332.2, 335; 335/13, 17

[56] References Cited

U.S. PATENT DOCUMENTS

| | | | |
|---|---|---|---|
| 3,886,338 | 5/1975 | Lokun et al. | 200/61.13 |
| 3,991,291 | 11/1976 | McGuffie et al. | 200/50.02 |
| 4,017,698 | 4/1977 | Kuhn et al. | 200/50.21 |
| 4,211,989 | 7/1980 | Acampora | 335/17 |
| 4,477,701 | 10/1984 | Castonguay et al. | 200/50.27 |
| 4,672,501 | 6/1987 | Bilac et al. | 361/96 |
| 4,786,885 | 11/1988 | Morris et al. | 335/202 |
| 4,794,356 | 12/1988 | Yu et al. | 335/13 |
| 4,801,906 | 1/1989 | Morris et al. | 335/17 |
| 4,831,221 | 5/1989 | Yu et al. | 200/553 |
| 4,987,395 | 1/1991 | Ozaki et al. | 335/17 |
| 5,036,303 | 7/1991 | Papallo, Jr. et al. | 335/17 |

FOREIGN PATENT DOCUMENTS

| | | | |
|---|---|---|---|
| 1326186 | 8/1973 | United Kingdom | H01H 71/04 |
| 2257565 | 1/1993 | United Kingdom | H01H 71/46 |

*Primary Examiner*—J. R. Scott
*Attorney, Agent, or Firm*—Richard A. Menelly; Carl B. Horton

[57] ABSTRACT

A circuit breaker position switch unit is mounted to the sidewall of an industrial type draw-out circuit breaker enclosure to indicate whether or not the circuit breaker is electrically-connected within the enclosure. A time dwell is provided by the structural arrangement of the switch actuator plate with respect to the position indicator bracket. The position switch finds application where a number of circuit breakers communicate with a central processor control unit.

22 Claims, 3 Drawing Sheets

5,684,282

DRAWOUT CIRCUIT BREAKER, POSITION SWITCH AND RESET ARRANGEMENTS

BACKGROUND OF THE INVENTION

Industrial applications employing several circuit breakers associated with various electrical equipment are oftentimes interconnected together electrically as well as interconnected with a central processor unit. The interconnection can consist of hard-wired electrical connection as well as over a local communications network. In such applications, it is helpful to know which of the circuit breakers are electrically connected with the associated electrical equipment at all times.

U.S. Pat. No. 4,672,501 entitled "Circuit Breaker and Protective Relay Unit" describes the employment of a communications module within each of the industrial circuit breakers to supply indication of the circuit breaker status.

U.S. Pat. No. 4,477,701 entitled "Secondary Disconnect Plugs for Programmable Circuit Breakers" describes the use of disconnect plugs on draw-out circuit breakers to connect and disconnect axially accessories when the circuit breaker is correspondingly connected and disconnected from the associated electrical equipment.

It would be beneficial to know when such draw-out circuit breakers not employing communications modules am connected or disconnected from associated electrical equipment as well as identifying the exact location of each one of the circuit breakers.

One purpose of the invention is to provide a circuit breaker position indicating switch to locate circuit breakers within a group and to identify the status of the circuit breaker with respect to the associated electrical equipment without requiring a communications data module of communications network.

SUMMARY OF THE INVENTION

A circuit breaker position indication switch is attached to each one of several industrial-rated circuit breakers within separate draw-out enclosures. The position indication switch interacts with a device within the draw-out enclosure when the circuit breaker is in the enclosure to provide status and position to a remote central processor unit. The switch unit includes a base plate supporting a switch actuating plate. A microswitch is mounted intermediate the base plate and the actuator plate. A bushing is arranged in abutment with a bottom of the switch actuator plate and a spring is connected with the switch actuator plate to bias the switch actuator plate against the bushing. The microswitch button provides on-off actuation of the microswitch in response to the switch actuator plate movement. A time dwell is provided by the structural arrangement of the switch actuator plate with respect to the position indicator bracket.

DESCRIPTION OF THE PREFERRED EMBODIMENT

Figure 1:
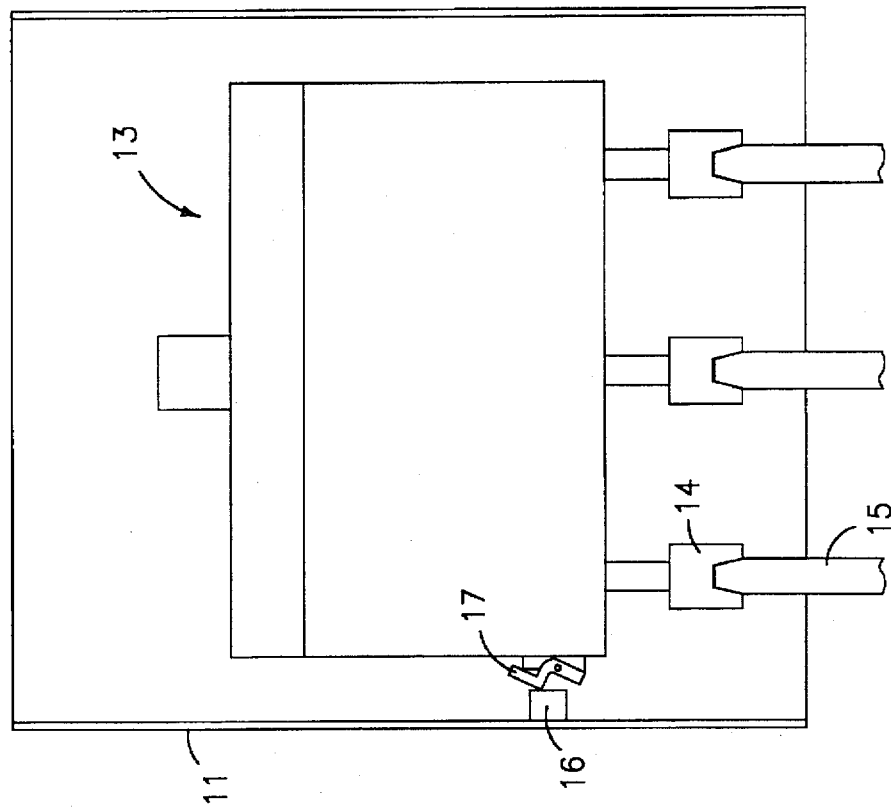
FIGS. 1 and 2 are top plan views of a circuit breaker enclosure with a circuit breaker containing the position indicator switch according to the invention, electrically-connected and electrically disconnected from the enclosure electrical supply respectively.
Figure 2:
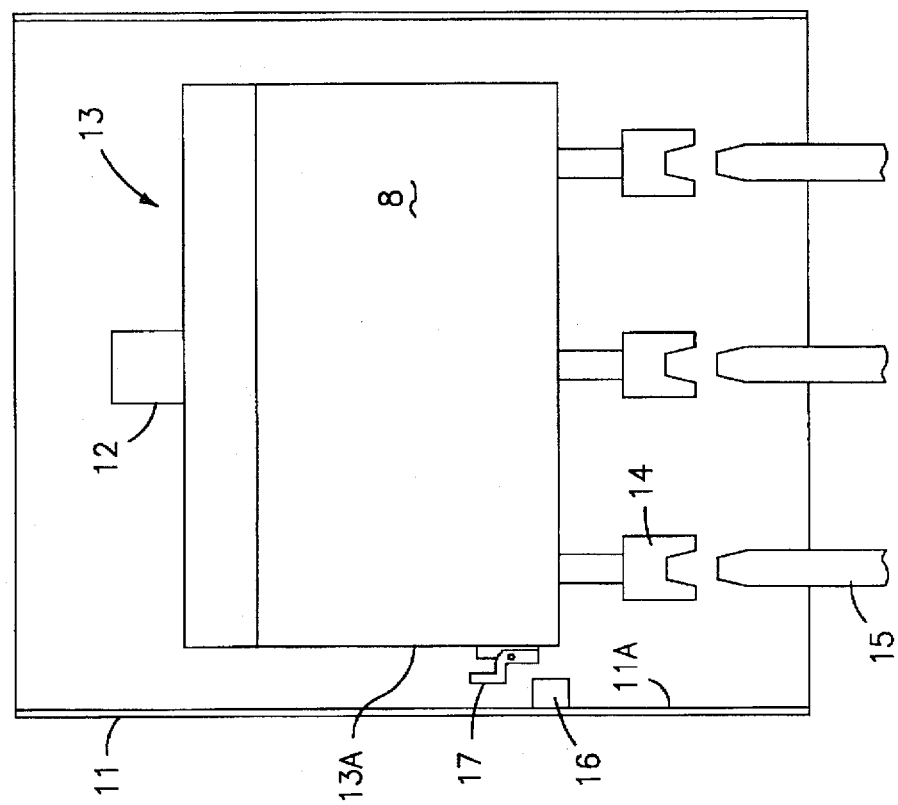

An industrial draw-out circuit breaker position indicating system 10 shown in FIGS. 1 and 2 includes a circuit breaker enclosure 11 and a draw-out circuit breaker 13. Electrical connection with the enclosure electrical conductor stabs 15 and the circuit breaker electrical connectors 14 is made by moving the draw-out circuit breaker within the enclosure. The operating handle 12 extending from the front of the draw-out circuit breaker 13 allows the circuit breaker to be turned ON and OFF. To provide indication of the connection status of the draw-out circuit breaker 13, a position switch assembly 17 is attached to a sidewall 13A of the circuit breaker housing 8 and a position indicator bracket 16 is attached to the sidewall 11A of the enclosure 11. With the draw-out circuit breaker disconnected from the enclosure electrical conductor stabs, as indicated in FIG. 1, the position indicator switch assembly 17 is out of abutment with the position indicator bracket 16. With the draw-out circuit breaker connected with the enclosure conductor stabs, as indicated in FIG. 2, the indicator switch assembly 17 abuts the indicator bracket 16 and provides electrical indication thereof by means of wire conductors (not shown).

Figure 3:
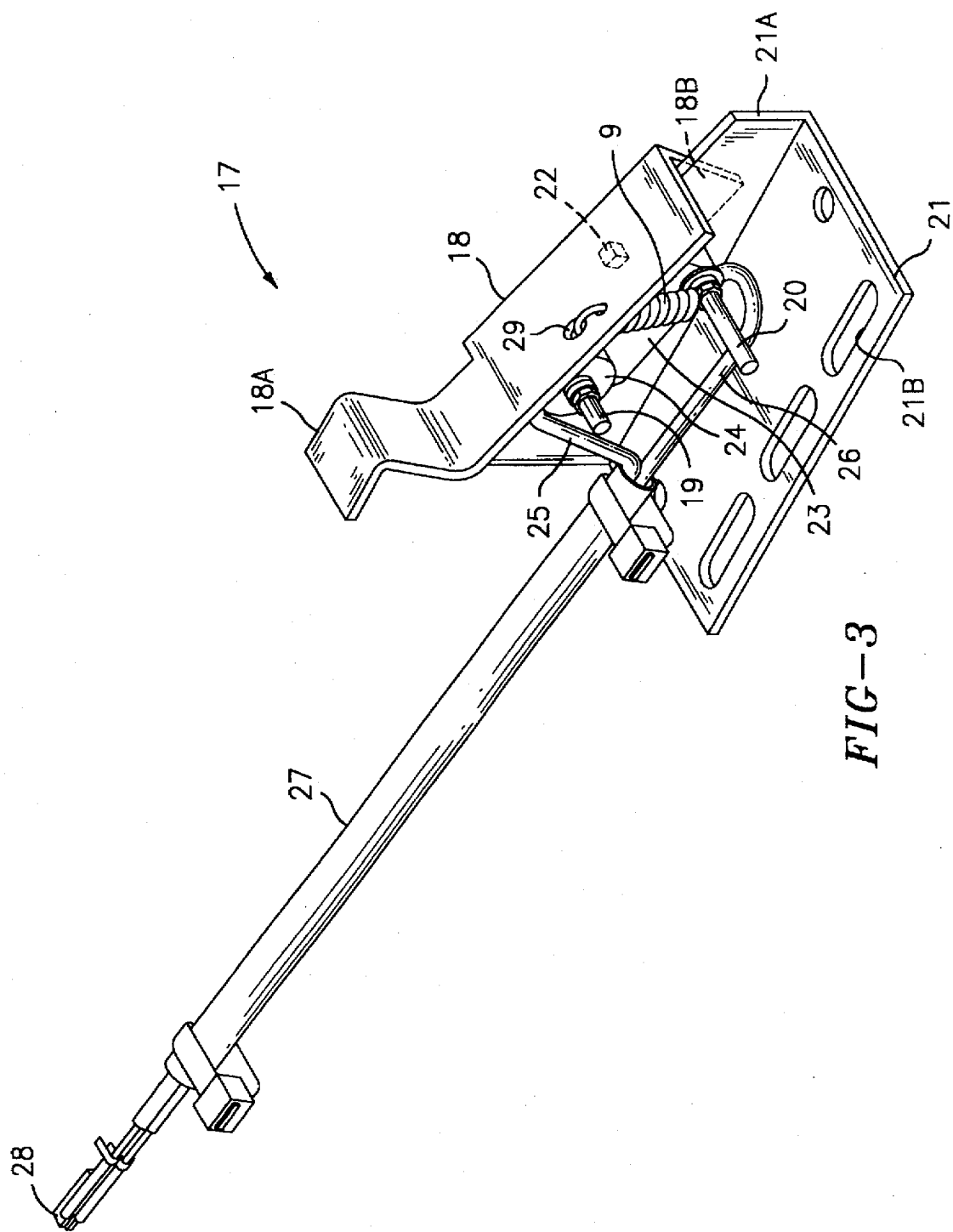
FIG. 3 is an enlarged top perspective view of the circuit breaker position indicator switch within the circuit breaker enclosures of FIGS. 1 and 2.

The operation of the position switch assembly 17 is best seen by now referring to FIG. 3. A metal baseplate 21 includes a sidewall 21A to which a microswitch 23 is attached along with a metal or plastic bushing 24 by means of a pivot pin 19 and an anchor pin 20. One type of plastic from which the bushing can be fabricated is Teflon, which is a trademark of Dupont for a durable fluorocarbon plastic material. The metal switch indicator plate 18 is connected to the base sidewall 21A by means of extending the pivot pin 19 through the base sidewall 21A and the indicator plate sidewall 18B. The position of the indicator plate 18 is set with respect to the microswitch actuator button 22 by means of the extension spring 9 that connects to the anchor pin 20 at one end and to the actuator plate next to and over the actuator button 22 by means of a pair of thru-holes as indicated at 29. The upstanding end 18A of the actuator plate 18 interacts with the position indicator bracket 16 of FIGS. 1 and 2 in the manner to be described below to activate the microswitch button 22 and provide indication thereof over conductors 25, 26 within cable 27 to a remote central processor unit (not shown) by means of the connectors 28. The baseplate 21 is attached to the side of the circuit breaker enclosure 11 (FIG. 1) by means of the elongated slots 21B.

Figure 4:
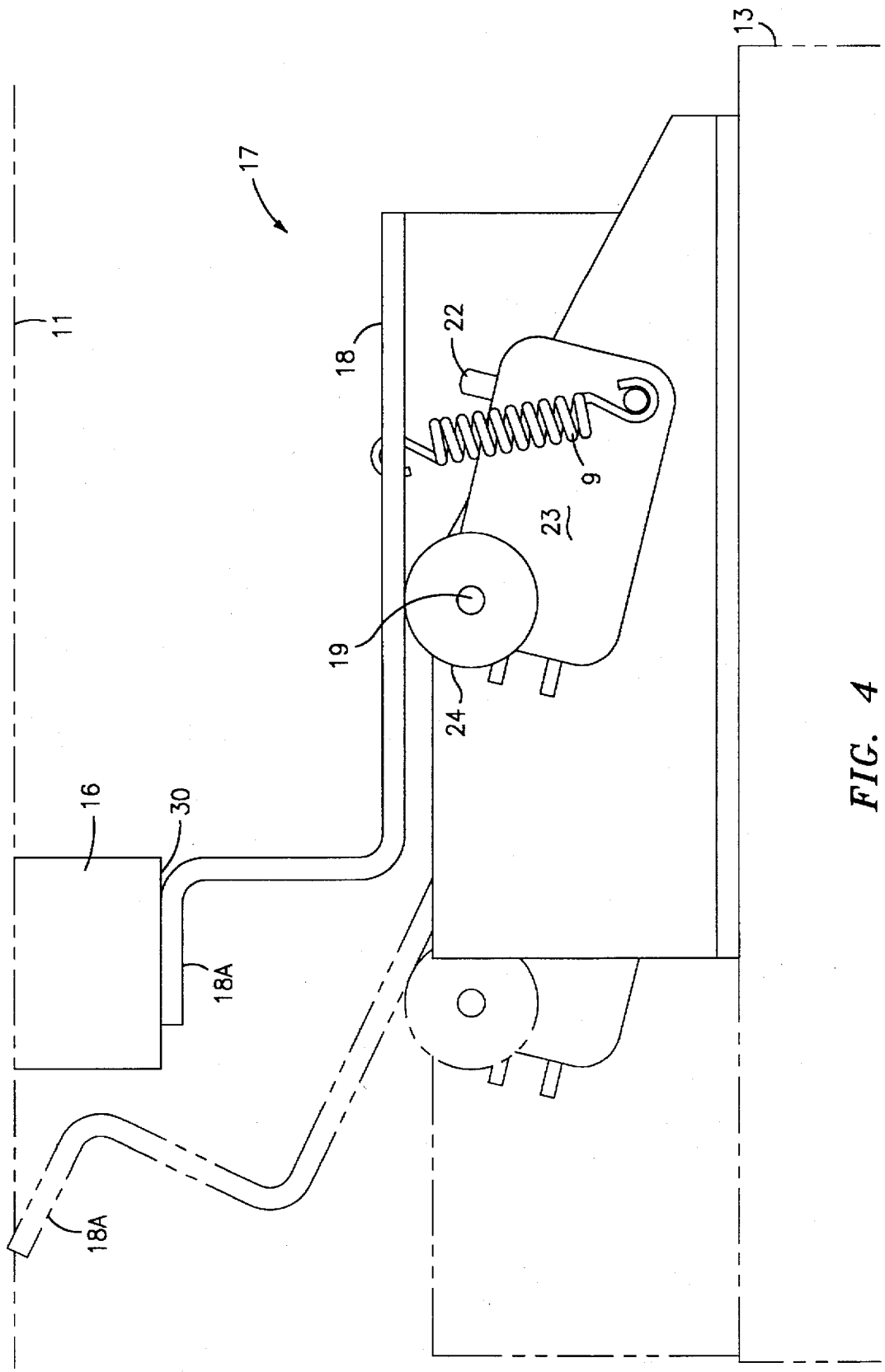
FIG. 4 is an enlarged top plan view of a part of the circuit breaker enclosure and position indicator switch of FIGS. 1 and 2.

The interaction between the end 18A of the actuator plate 18 within the position switch assembly 17 attached to the circuit breaker 13 and the position indicator bracket 16 attached to the enclosure 11 is now shown in FIG. 4. The end 18A of the actuator plate 18 within the circuit breaker position switch assembly 17 is depicted in phantom prior to movement of the circuit breaker 13 in the indicated direction within the circuit breaker enclosure 11. Immediately upon contacting the forward edge of the bracket 16, the end 18A becomes downwardly driven under the bottom 30 of the bracket and moves in cam-follower fashion along the extent of the bottom 30. The dimensions of the bottom 30 and the end 18A are controlled to provide a dwell time between the time the electrical stabs 15 first contact the electrical connectors 14, of FIG. 1, to insure that the microswitch remains activated as the circuit breaker 13 advances within the compartment 11. The force between the bottom of the actuator plate 18 and the surface of the bushing 24 is translated into rotation of the bushing about the pivot 19 to stabilize the rotation of the actuator plate 18 upon repeated operations. The microswitch 23 is arranged in a normally-open condition with the switch actuator button 22 in contact with the bottom of the actuator plate 18 under the urgence of the extension spring 9 until the actuator plate is driven out of contact with the actuator button upon contact between the end 18A and the bracket 16 as depicted in solid lines. When the circuit breaker is moved in the opposite direction out of the enclosure 11, the end 18A returns to the position indicated in phantom, and the bottom of the actuator plate is driven against the actuator button to open the microswitch 23 under the return bias of the extension spring 9 to provide remote indication of the change in position of the circuit breaker 13. In the clockwise and counterclockwise rotation of the actuator plate 18, the rotation of the bushing 24 stabilizes the rotation of the actuator plate 18 relative to the actuator button 22 and is an important feature of the invention.

A circuit breaker position indication system utilizing an actuator switch assembly and position indicator bracket has herein been described. The ON-OFF condition of the microswitch provides remote indication as to the position and electric circuit condition of the associated circuit breaker.

We claim:

1. A circuit breaker position indicator comprising:

a base plate supporting a switch actuator plate;

a microswitch intermediate said base plate and said actuator plate;

an actuator button on said microswitch, said button positioned relative to said switch actuator plate for on-off actuation of said microswitch in response to movement of said switch actuator plate;

a bushing arranged in abutment with a bottom of said switch actuator plate; and bias means connecting with said switch actuator plate biasing said switch actuator plate against said bushing.

2. The position indicator of claim 1 wherein said switch actuator plate includes an upstanding front end that is shaped to provide a time dwell in association with a position indicator bracket.

3. The position indicator of claim 2 wherein said position indicator bracket is shaped to provide a time dwell in association with said switch actuator plate.

4. The position indicator of claim 1 wherein said bushing comprises metal or plastic.

5. The position indicator of claim 1 including a base sidewall upstanding from said base plate, said microswitch being attached to said base sidewall.

6. The position indicator of claim 5 including a pivot pin connecting said bushing to said base sidewall, said bushing being arranged for rotation in response to movement of said actuator plate.

7. The position indicator of claim 5 including an anchor pin extending from said base sidewall, one end of said bias means being attached to said anchor pin and an opposite end of said bias means being attached to said actuator plate.

8. The position indicator of claim 5 wherein said actuator plate includes an actuator sidewall, said pivot pin being arranged through said actuator sidewall for rotation of said actuator plate in response to said position indicator bracket.

9. The position indicator of claim 1 wherein said base plate includes means for attachment to a circuit breaker sidewall.

10. The position indicator of claim 1 wherein said bias means comprises an extension spring.

11. The position indicator of claim 4 wherein said plastic comprises Teflon.

12. A draw-out circuit breaker comprising:

a circuit breaker housing having an operating handle extending from one end and electrical connectors extending from an opposite end thereof;

a circuit breaker position indicator mounted on said circuit breaker housing and arranged for interacting with means on a circuit breaker enclosure for providing remote indication as to the electrical connection of said circuit breaker within said enclosure, said position indicator including:

a base plate supporting a switch actuator plate;

a microswitch intermediate said base plate and said actuator plate;

an actuator button on said microswitch, said button positioned relative to said switch actuator plate for on-off actuation of said microswitch in response to movement of said switch actuator plate;

a bushing arranged in abutment with a bottom of said switch actuator plate; and bias means connecting with said switch actuator plate biasing said switch actuator plate against said bushing.

13. The draw-out circuit breaker of claim 12 wherein said switch actuator plate includes an upstanding front end that is shaped to provide a time dwell in association with a position indicator bracket.

14. The draw-out circuit breaker of claim 12 wherein position indicator bracket is shaped to provide a time dwell in association with said switch actuator plate.

15. The draw-out circuit breaker of claim 12 wherein bushing comprises metal or plastic.

16. The position indicator of claim 12 including a base sidewall upstanding from said base plate, said microswitch being attached to said base sidewall.

17. The draw-out circuit breaker of claim 16 including a pivot pin connecting said bushing to said base sidewall, said bushing being arranged for rotation in response to movement of said actuator plate.

18. The draw-out circuit breaker of claim 16 including an anchor pin extending from said base sidewall, one end of said bias means being attached to said anchor pin and an opposite end of said bias means being attached to said actuator plate.

19. The draw-out circuit breaker of claim 12 wherein said actuator plate includes an actuator sidewall, said pivot pin being arranged through said actuator side wall for rotation of said actuator plate in response to said position indicator bracket.

20. The draw-out circuit breaker of claim 12 wherein said base plate includes means for attachment to a circuit breaker sidewall.

21. The draw-out circuit breaker of claim 12 wherein said bias means comprises an extension spring.

22. The draw-out circuit breaker of claim 15 wherein said plastic comprises Teflon.

* * * * *